US011379824B2

(12) United States Patent
Deshpande et al.

(10) Patent No.: US 11,379,824 B2
(45) Date of Patent: Jul. 5, 2022

(54) PRIVACY PRESERVING TRANSACTIONS WITH PROBABILISTIC TRANSACTION FEES

(71) Applicant: International Business Machines Corporation, Armonk, NY (US)

(72) Inventors: Pralhad Dinesh Deshpande, Singapore (SG); Chun Hui Suen, Singapore (SG); Muhammad Tayyab Asif, Singapore (SG)

(73) Assignee: International Business Machines Corporation, Armonk, NY (US)

(*) Notice: Subject to any disclaimer, the term of this patent is extended or adjusted under 35 U.S.C. 154(b) by 597 days.

(21) Appl. No.: 16/013,054

(22) Filed: Jun. 20, 2018

(65) Prior Publication Data

US 2019/0392406 A1    Dec. 26, 2019

(51) Int. Cl.
| | | |
|---|---|---|
| *G06Q 20/36* | (2012.01) | |
| *G06Q 20/06* | (2012.01) | |
| *G06Q 20/40* | (2012.01) | |
| *H04L 9/06* | (2006.01) | |
| *G06F 21/60* | (2013.01) | |
| *H04L 9/32* | (2006.01) | |
| *G06Q 20/38* | (2012.01) | |

(52) U.S. Cl.
CPC .......... *G06Q 20/36* (2013.01); *G06F 21/602* (2013.01); *G06Q 20/06* (2013.01); *G06Q 20/389* (2013.01); *G06Q 20/3829* (2013.01); *G06Q 20/405* (2013.01); *H04L 9/0637* (2013.01); *H04L 9/3265* (2013.01); *G06Q 2220/00* (2013.01)

(58) Field of Classification Search
CPC .... G06Q 20/06; G06Q 20/36; G06Q 20/3829; G06Q 20/405; G06Q 2220/00; G06Q 20/389; G06F 21/602; H04L 9/0637; H04L 9/3265
See application file for complete search history.

(56) References Cited

U.S. PATENT DOCUMENTS

| 6,658,568 | B1 * | 12/2003 | Ginter | ................... H04N 7/162 380/231 |
|---|---|---|---|---|
| 2002/0099822 | A1 * | 7/2002 | Rubin | ................... H04L 9/3268 709/225 |

(Continued)

FOREIGN PATENT DOCUMENTS

WO    WO-2004049273 A1 *    6/2004    ............. G06Q 20/06

OTHER PUBLICATIONS

Schneier, Bruce; "Applied Cryptography", 1996, John Wiley & Sons, Inc.*
Antonopoulos, Andreas; "Mastering Bitcoin", 2014, O'Reilley Media, Inc.*

(Continued)

*Primary Examiner* — Steven S Kim

(57) ABSTRACT

An example operation may include one or more of receiving transaction parameters for a blockchain transaction into a transaction wallet interface of a transaction wallet of a sender, the transaction parameters comprising a transaction amount and an intended recipient address. The example operation may include generating a blockchain transaction that specifies the transaction amount and a single recipient address selected from the intended recipient address and a mining pool address of a mining pool, and providing the generated blockchain transaction to the mining pool.

12 Claims, 10 Drawing Sheets

(56) References Cited

U.S. PATENT DOCUMENTS

| | | | | |
|---|---|---|---|---|
| 2010/0019453 | A1* | 1/2010 | Oakes | G07F 17/3237 |
| | | | | 273/269 |
| 2015/0262176 | A1* | 9/2015 | Langschaedel | G06Q 20/382 |
| | | | | 705/71 |
| 2017/0083907 | A1* | 3/2017 | McDonough | G06Q 20/3829 |
| 2017/0085555 | A1 | 3/2017 | Bisikalo et al. | |
| 2018/0227293 | A1* | 8/2018 | Uhr | H04L 9/0894 |
| 2018/0349894 | A1* | 12/2018 | Patrinos | G06Q 20/3829 |
| 2019/0034920 | A1* | 1/2019 | Nolan | G06Q 20/4012 |
| 2019/0108498 | A1* | 4/2019 | Deshpande | H04L 9/3239 |
| 2019/0173872 | A1* | 6/2019 | Arora | H04L 63/0442 |
| 2019/0378133 | A1* | 12/2019 | Deshpande | G06F 16/1805 |
| 2019/0392406 | A1* | 12/2019 | Deshpande | G06F 21/64 |
| 2020/0134586 | A1* | 4/2020 | Wu | G06Q 20/367 |

OTHER PUBLICATIONS

Salimitari et al., "Profit Maximization for Bitcoin Pool Mining: A Prospect Theoretic Approach," 2017 IEEE 3rd International Conference on Collaboration and Internet Computing (CIC), 2017, pp. 267-274.*

I. Eyal, "The Miner's Dilemma," 2015 IEEE Symposium on Security and Privacy, 2015, pp. 89-103.*

Pontiveros et al., "Monitoring the transaction selection policy of Bitcoin mining pools," NOMS 2018—2018 IEEE/IFIP Network Operations and Management Symposium, 2018, pp. 1-6.*

Conti et al., "A Survey on Security and Privacy Issues of Bitcoin," in IEEE Communications Surveys & Tutorials, vol. 20, No. 4, pp. 3416-3452.*

Moreno-Sanchez, Pedro, et al., "Privacy Preserving Payments in Credit Networks," Network and Distributed Security Symposium, NDSS '15, Feb. 8-11, 2015, 15 pages, See Figure 6.

* cited by examiner

400

PRIVACY PRESERVING TRANSACTIONS WITH PROBABILISTIC TRANSACTION FEES

TECHNICAL FIELD

This application generally relates to blockchain technology and more particularly, to ensuring transaction privacy on a distributed ledger (such as a blockchain).

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Many cryptocurrency and similar transaction systems maintain the distributed ledger in a public domain and thus it is open to anyone to interrogate the ledger to determine the parties involved in transactions. A process referred to as transaction graph analysis, which follows the links of sender addresses and recipient addresses through a transaction tree, is particularly effective in uncovering the transactions of a party. Coupled with web-scraping techniques which are able to match real entities, company names, etc. with the public keys used in transactions, entity identities can be revealed, together with the types of transactions the entity is involved in.

In some circumstances, an entity may wish to maintain privacy of their blockchain transactions. The following requirements have been identified as ones required to achieve cash equivalent privacy, i.e., prevent effective transaction graph analysis:
 never reuse an address;
 never merge Unspent Transaction Outputs (UTXOs)—all transactions should have 1 input and 1 output;
 uniform transactions—a UTXO should always have the same value. The value of a UTXO can belong to a certain predetermined set, e.g., {1, 10, 100, . . . }.

A problem arises when a transaction requires a transaction fee to be added by the sender in order for a transaction to be confirmed by a mining pool, as is common in many cryptocurrency based trading systems. When a transaction fee is added to a transaction, both the requirements for a single output (recipient only) and a uniform transaction amount, will potentially be violated. Thus, what is required is a system and method by which transactions can be conducted while preserving cash equivalent privacy.

SUMMARY

One example embodiment may provide a method that includes one or more of receiving transaction parameters for a blockchain transaction into a transaction wallet interface of a transaction wallet of a sender, the transaction parameters comprising a transaction amount and an intended recipient address. The method may include generating a blockchain transaction that specifies the transaction amount and a single recipient address selected from the intended recipient address and a mining pool address of a mining pool, and providing the generated blockchain transaction to the mining pool.

Another example embodiment may provide a hardware transaction wallet comprising one or more processors and one or more memories operatively associated with the one or more processors. The hardware transaction wallet may be programmed to receive transaction parameters for a blockchain transaction, the transaction parameters comprising a transaction amount and an intended recipient address. The hardware transaction wallet may be programmed to generate a blockchain transaction that specifies the transaction amount and a single recipient address selected from the intended recipient address and a mining pool address of a mining pool. The hardware wallet may be programmed to provide the generated blockchain transaction to the mining pool.

A further example embodiment may provide a non-transitory computer readable medium comprising instructions, that when read by a processor, cause the processor to perform one or more of receiving transaction parameters for a blockchain transaction into a transaction wallet interface of a transaction wallet of a sender, the transaction parameters comprising a transaction amount and an intended recipient address; generating a blockchain transaction that specifies the transaction amount and a single recipient address selected from the intended recipient address and a mining pool address of a mining pool; and providing the generated blockchain transaction to the mining pool.

DETAILED DESCRIPTION

Figure 1:
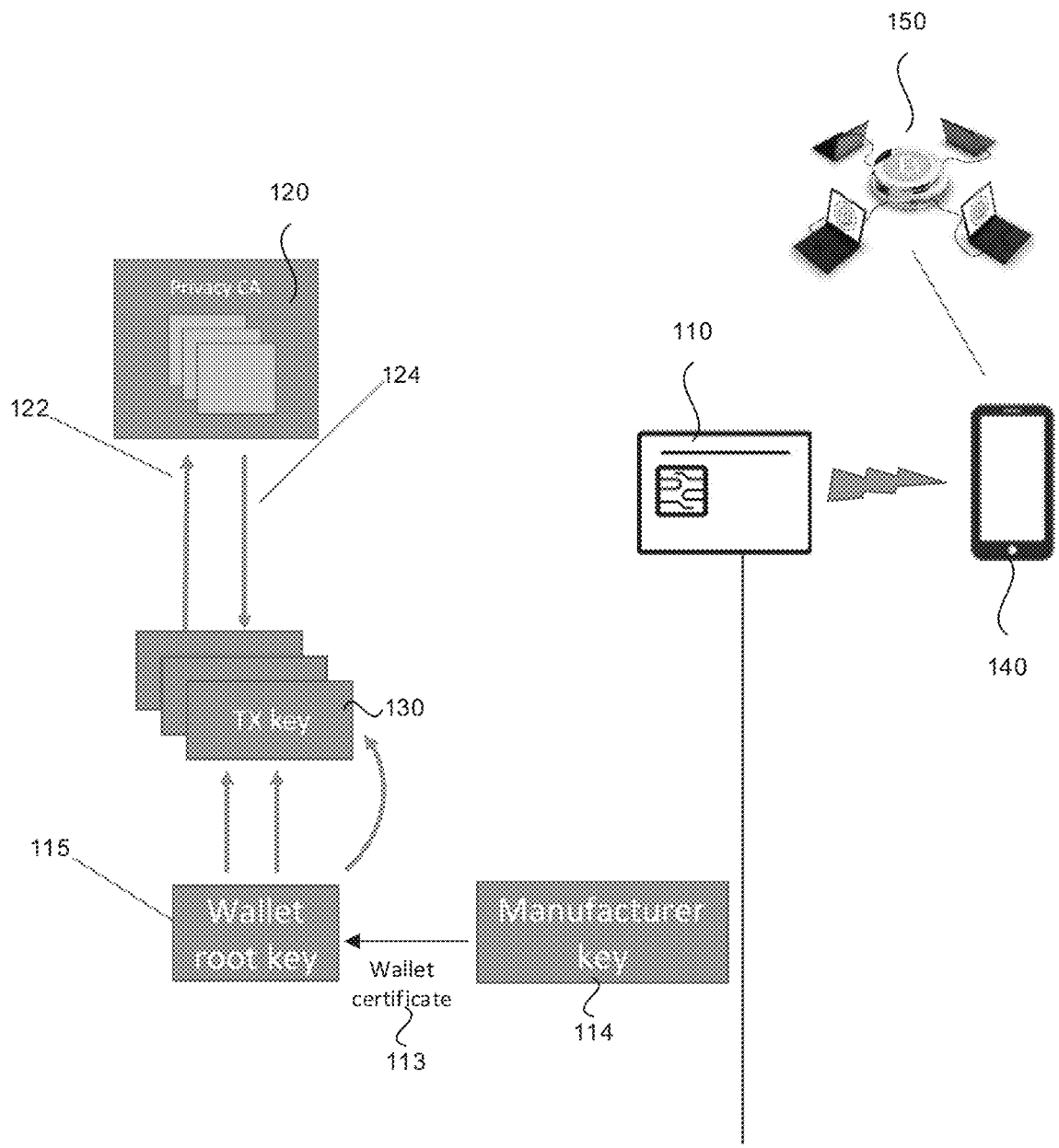
FIG. 1 illustrates system architecture for a hardware wallet in a blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide transaction privacy for blockchain transactions.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The generation of a new block in a blockchain is often undertaken by a collection of computer resources called a mining pool. Within any blockchain network there may be many such mining pools that function to "solve" a block by generating a cryptographic hash of a block header that meets particular requirements, such as being less than a target value. When a mining pool solves a block, it forms a new block containing the block solution and one or more transactions from a transaction queue. By this process, a transaction may be confirmed and incorporated into the blockchain.

The number of transactions that can be included in a block may be limited, for example by the maximum permissible size of the block. When a new block is formed, if the pending transaction queue is less than the maximum allowable size of the block, then all pending transactions will be included in the block. However, if the pending transaction queue is greater than the allowable block size, then the mining pool that generates the block may select which transactions to include in the block. To ensure that a transaction is included, a party that generates the transaction, e.g. a client, account owner, etc., may offer a transaction fee that is payable to the mining entity. Higher fee transactions are more likely to be included in the transaction block. Low value transactions with low fees may therefore need to wait many hours and sometimes days for the transactions to be confirmed by inclusion in a block.

Peer entities within the blockchain network may provide wallets to enable clients to manage their cryptocurrency and transactions. A wallet stores an address (public key) for receiving currency as well as the private key used in digitally signing transaction requests. Cryptocurrency wallets may be provided in various forms, including paper wallets (that store the information in non-electronic form, e.g. printed on paper, plastic, metal or other media), hardware wallets (that store the information electronically but in an offline electronic media such as a smartchip card, USB drive, etc.) and various forms of network connected wallets including mobile wallets, desktop wallets, web wallets, etc.

Hardware wallets exist in many physical forms. Typically, a hardware device will include some form of memory for storing private and public keys, transaction history, etc. The hardware wallet will also typically include a degree of processing ability, e.g. a microprocessor provided by an onboard integrated circuit, that enables some functions to be performed, code to be executed, etc. The hardware wallet will typically also include a means for communication, which may be via, without limitation, USB connection, Near Field Communication (NFC) protocols, Bluetooth, radio frequency (RF) communications, etc. The hardware wallet includes a random number generator (RNG) for generating transaction keys from a root key, and potentially other functions as will be described herein below.

The hardware wallet may be devised to work in conjunction with software operating on a user computer, such as a web browser, for accessing a blockchain network. The software reads the information from the hardware wallet and may invoke code that is stored on the hardware wallet to generate and authorize transactions. The user computer may be any suitable network enabled device including, without limitation, a desktop, laptop, mobile phone, etc.

The wallet may provide a wallet interface for enabling a user to generate and authorize transactions, check transaction histories, etc.

To meet the requirements for enhanced transaction privacy of blockchain transactions, a hardware wallet may be configured to generate single output transactions in which transaction fees paid to the mining pool are determined probabilistically. The hardware wallet may be programmed with a probability factor. When the hardware wallet receives transaction parameters including an intended recipient address, the wallet generates a random number. Depending on the outcome, the wallet generates a transaction with either the intended recipient (e.g. 99%) or the mining pool (e.g. 1%) as the recipient address. The transaction is submitted to the mining pool for commitment to the blockchain. The transaction has no attached fee, but the mining pool will receive payment for a percentage of transactions from the wallet determined by the probability factor.

FIG. 1 illustrates a logic network diagram for implementing transaction privacy in a blockchain system according to example embodiments. Referring to FIG. 1, the network 100 includes a hardware wallet 110 that is manufactured by a hardware wallet provider. The hardware wallet manufacturer creates a wallet certificate 113, signed with the manufacturer key 114 to indicate that the device is a valid hardware wallet. The wallet certificate vouches for the logic on the wallet. A wallet root key 115 is created using a hardware random number generator (RNG) inside the device. The wallet root key is burned into the hardware at manufacture time. The wallet root key 115 is then used in conjunction with a random number generator programmed into the wallet, to generate subsequent transaction (Tx) keys.

The wallet engages a privacy Certification Authority (CA) 120. The wallet sends a transaction certificate request 122 signed by the wallet root key and the wallet certificate to the Privacy CA 120. The Privacy CA 120 verifies that the wallet certificate 113 comes from a whitelist of known manufacturers and if verified, generates an anonymous transaction certificate 124 for the wallet signed by the private CA key.

Using the generated transaction certificate, the wallet may form a transaction. When a transaction is required, the user connects the wallet 110 to their network device 140 to provide the interface for generating the transaction. The user may enter transaction parameters including the amount to be transferred (uTxO) and the recipient (toAddress). The wallet uses its random number generator to create a transaction key (private key) 130, signed by the wallet root key. The wallet forms the transaction and the device 140 sends the transaction parameters (uTxO, ToAddress) from the wallet 110 to the mining pool 150. The wallet attaches the transaction certificate, which is signed by the privacy CA, to prove that the transaction is from a valid hardware wallet. The mining pool 150 may interface with the privacy CA 120 to verify the transaction certificate and hence the transaction. The transaction is committed to the blockchain by the mining pool 150. The architecture 100 of FIG. 1 can be used to generate anonymous transaction keys for use as the sender address in blockchain transactions.

Figure 2A:
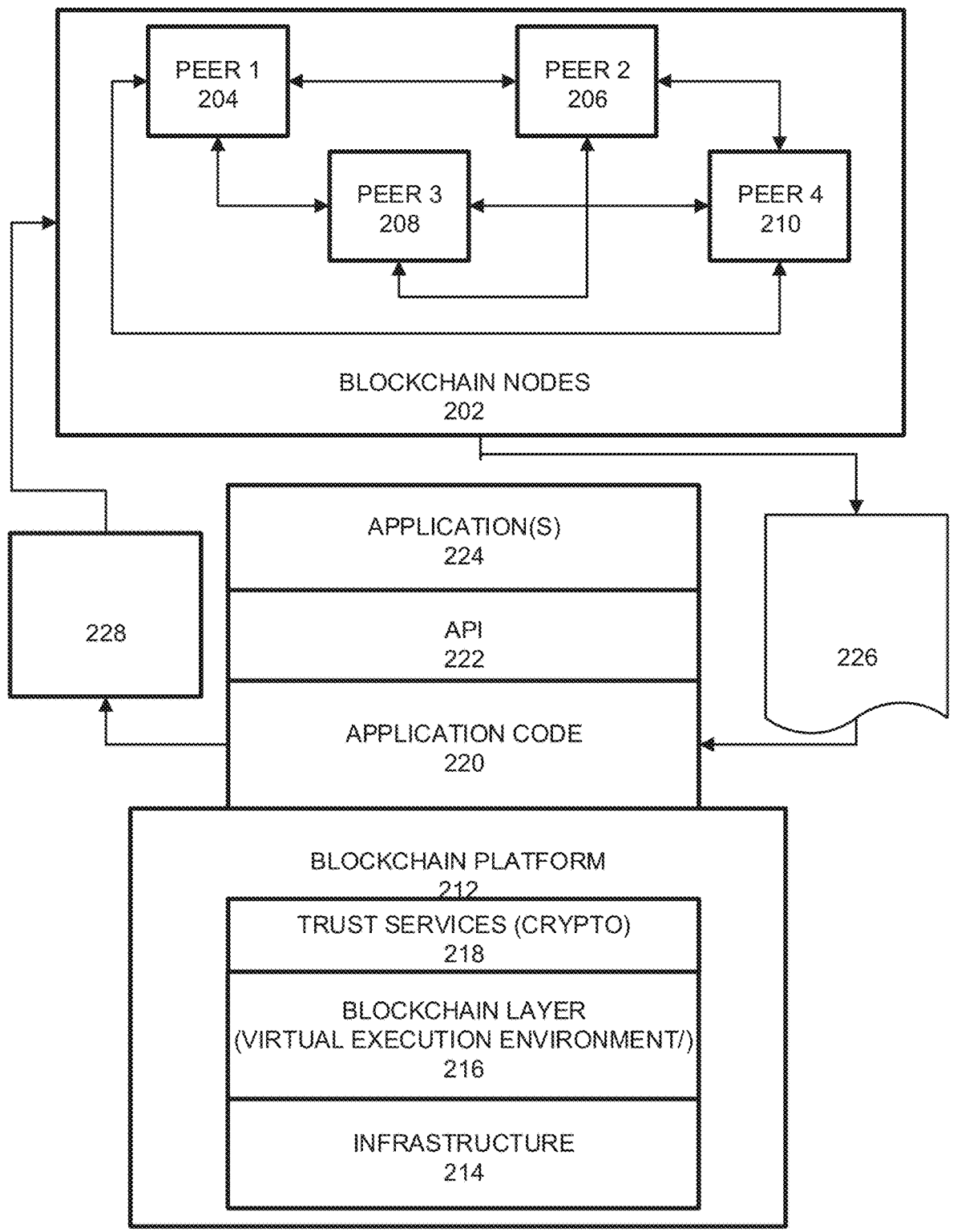
FIG. 2A illustrates an example peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, a ledger query 226 may be processed by one or more processing entities (e.g., virtual machines) included in the blockchain layer 216. The ledger query result 228 may include details of a transaction including amount transferred, sending party, receiving party, etc. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
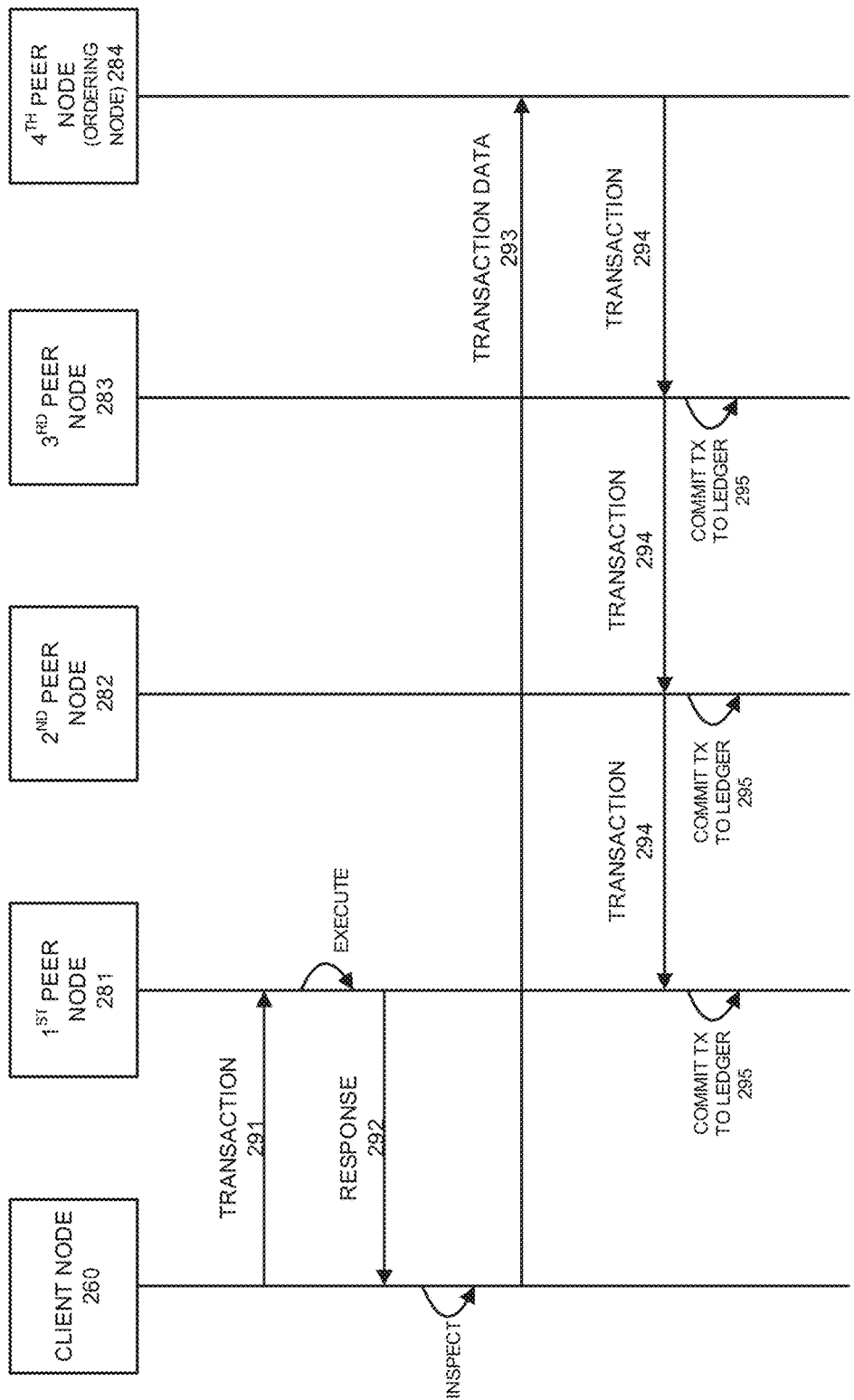
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
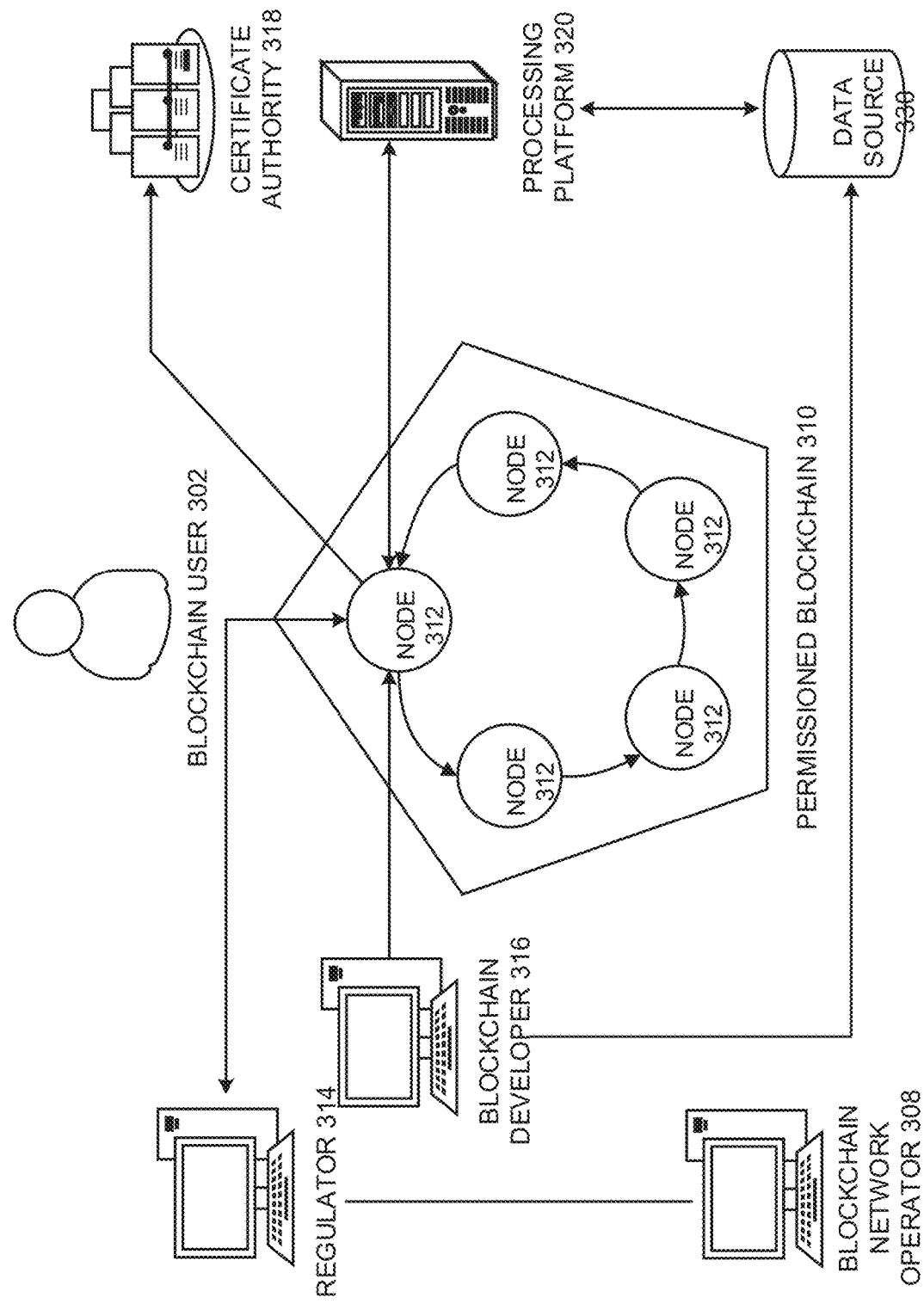
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
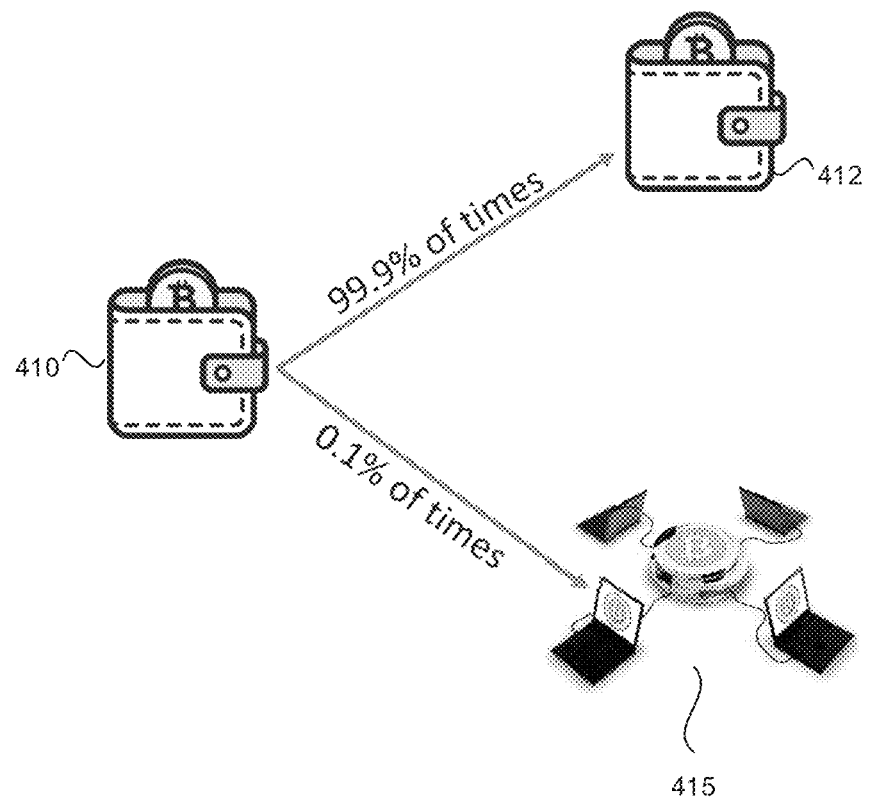
FIG. 4 illustrates an interaction between wallets of a blockchain network using probabilistic transaction fees.

FIG. 4 illustrates an embodiment 400 for performing a blockchain transaction with transaction privacy (cash equivalent privacy), according to example embodiments. Referring to FIG. 4, there may be a transaction to be conducted from a hardware wallet, e.g. Alice's wallet 410, which may be a wallet configured as described above with reference to FIG. 1. The intended recipient may be another wallet within the blockchain network e.g. Bob's wallet 412. The recipient may be any wallet type configured to receive currency on the blockchain network. Transactions from Alice's wallet are sent to a mining pool 415 to be committed to the blockchain by the mining pool. To implement cash equivalent privacy, the hardware wallet provider may collaborate with the mining pool to process transactions with no fees. Upon receiving Alice's input, the hardware wallet 410 uses a probability factor to determine whether the actual recipient is to be the intended recipient (e.g. Bob's wallet) or the mining pool. The recipient selection is based on a probability factor negotiated between the wallet provider and the mining pool and cannot be influenced by the sender, i.e. Alice. The transaction is formulated with the determined recipient as the ToAddress and the UTXO is transferred to either the intended recipient (i.e. Bob's wallet) or to the mining pool without breaking the UTXO.

In this manner, the requirement for the transaction to have only a single output and a uniform transaction amount are preserved and cash equivalent privacy can be maintained.

In the embodiment shown, the probability factor is 0.01, thus ensuring that, on average, the mining pool is paid for 1% of the transactions while 99% of transactions pass to the intended recipient 412.

The wallet application needs to behave in a trustworthy manner. In the present case, the concern is making a probabilistic decision with certain probabilities attributed to each outcome (send transaction to X or Y with given probabilities). One way to achieve this is to burn some logic and keys in hardware. Any output generated by the logic is signed by the key burned into the hardware proving that this computation is done in a secure, trustworthy manner.

Figure 5A:
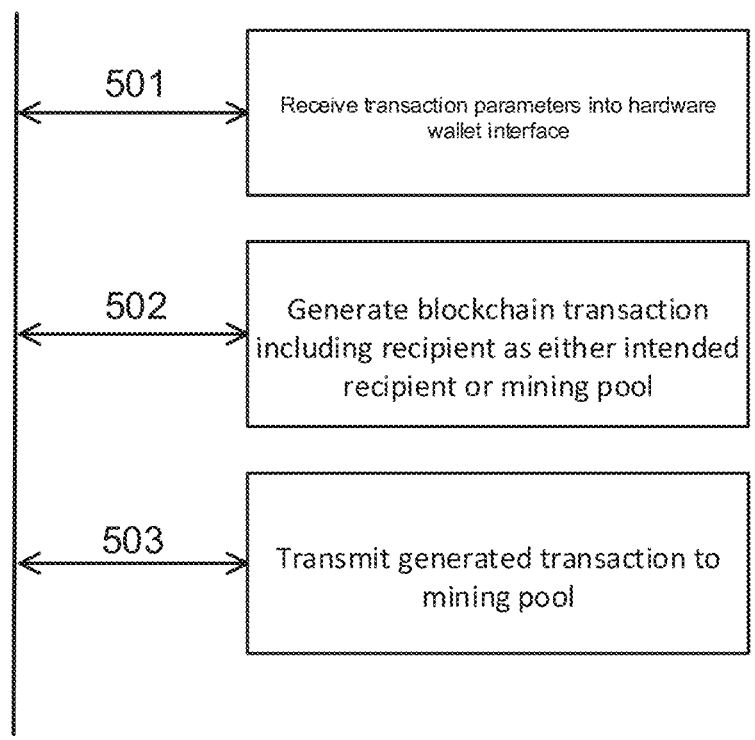
FIG. 5A illustrates a flow diagram of an example method of a hardware wallet transaction in a blockchain, according to example embodiments.

FIG. 5A illustrates a flow diagram 500 of an example method for probabilistically determining transaction fees for a blockchain transaction, according to example embodiments. Referring to FIG. 5A, the method 500 may include receiving transaction parameters for a blockchain transaction into a transaction wallet of a sender 501. The transaction parameters may include a transaction amount and an intended recipient address. A blockchain transaction is generated 502 by the hardware wallet that specifies the transaction amount and a single recipient address selected from the intended recipient address and a mining pool address. Whether the output address is the intended recipient address or the mining pool address may be determined probabilistically, as will be described in more detail below. The generated blockchain transaction is transmitted to the mining pool for committal to the blockchain 503.

Figure 5B:
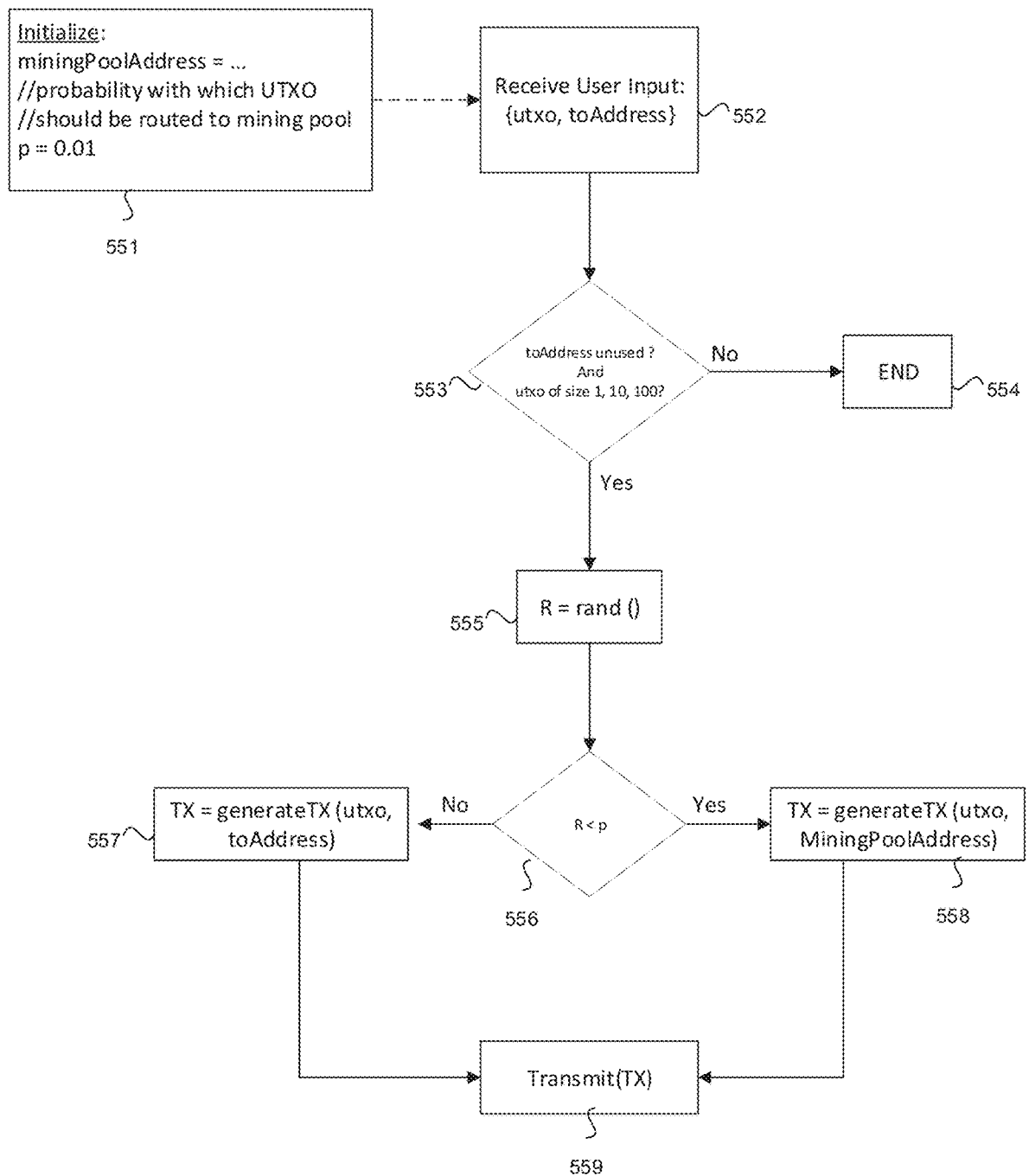
FIG. 5B illustrates a flow diagram of an example method of probabilistically determining mining pool transaction fees in a blockchain, according to example embodiments.

FIG. 5B illustrates a flow diagram 550 of an example method for maintaining transaction privacy using probabilistic transaction fees during a blockchain transaction, according to example embodiments. As an initialization step 551, a probability factor is set as the probability with which the UTXO specified in a transaction should be routed to the mining pool. In an example embodiment, the probability factor may be 0.01, i.e. 1%, though any probability factor between 0 and 1 may be established subject to operational requirements. The probability factor may be programmed into the hardware wallet in a manner that cannot be modified or tampered with by the wallet owner, e.g. Alice. A transaction may commence at step 552 when the hardware wallet configured in accordance with embodiments described herein may be programmed by the user, via a user interface, with a transaction that specifies transaction parameters including an UTXO and a toAddress for an intended recipient. At step 553, an optional check may be made to assess whether the transaction privacy requirements are met. Specifically, the transaction history recorded on the blockchain is checked to determine that no previous transaction sent from the wallet has specified the provided toAddress, and the size of the UTXO is one of the allowable set sizes, e.g. 1, 10, 100, etc. If the transaction privacy checks are not passed, the transaction may terminate 554 with appropriate notifications to the user on the user interface if required.

If the transaction privacy check is satisfied, then the wallet may proceed to a probabilistic determination of the output recipient. A random number between 0 and 1 is generated 555, e.g. using the hardware RNG of the wallet. If the number generated is greater than the programmed probability 556, then the transaction can proceed as intended. That is, a transaction is generated using the specified UTXO and the toAddress of the intended recipient specified by the user 557. Otherwise, i.e. if the number generated is less than the probability factor, a transaction is generated that specifies the UTXO but with the toAddress set to the MiningPoolAddress 558.

The transaction may be generated as described above with reference to FIG. 1 in which a transaction key is generated that protects the anonymity of the sender wallet. Once the transaction has been formulated, the transaction is transmitted to the mining pool for commitment into the blockchain 559. When the transaction parameters have been modified, the UTXO payment will transfer to the mining pool and thus the mining pool will receive a payment for handling the transactions of the wallet not on a per transaction basis as for regular wallets, but in a probabilistic manner at a probability rate set by the probability factor. For modified transactions, the sender will be able to see the modified transaction and repeat the transaction to ensure that the intended transaction to the intended recipient proceeds.

In one embodiment, there may be a single probability factor as herein described. In alternative embodiments, there may be multiple probability factors. For example, the probability factor may be dependent on UTXO amount, say, if UTXO=1, then p=0.01, but if UTXO=100, then UTXO=0.005

The present embodiments describe a business ecosystem where a hardware wallet provider collaborates with a mining pool. The mining pool promises to process transactions from individual hardware wallets without any transaction fees. In return, the hardware wallet probabilistically generates transactions addressed to the mining pool itself. Using such a system, it can be seen from the present examples and embodiments that the generated transaction meets all of the requirements for improving transaction privacy (unused sender address, unused toAddress, uniform UTXO amount and a single input and output for the transaction). The method solves the problem of being able to provide a transaction fee to the mining pool by paying the transaction fee at a probability rate, rather than as a portion of each transaction, thereby allowing the transaction to remain unsplit. The user/wallet owner accepts that occasionally some payments will be rerouted to the mining pool instead of the intended recipient. The trade off for this inconvenience is that the user is able to conduct hardware wallet based transactions but with the required privacy.

The transaction is not limited to be sent to a specific mining pool. The wallet may be configured to forward the transaction to multiple mining pools, thereby increasing the chances that the transaction will be committed sooner in the blockchain. On each transaction where the payment amount is to be rerouted, the wallet will configure the ToAddress to the respective mining pool address. Each mining pool that can accept and commit transactions without fees, except by the probabilistic manner described herein, will be able to process the transaction. These mining pools will be configured at the time of manufacture of the hardware wallet so that the mining pool identities can be burned into the hardware of the wallet.

To enhance privacy further, the hardware wallet provider may provide a service for peers that hold hardware wallets from that provider to discover each other. Peers may exchange wallet addresses using anonymous communications protocols, of which the Tor platform is one example.

The method of FIG. 5B may be implemented inside the hardware wallet and signed by the wallet provider. That is, the hardware wallet may store executable code. When the hardware wallet is connected to a user computer having a processor capability, software on the hardware wallet may execute, in isolation or in conjunction with software and applications on the user computer, to provide an interface by which the user may enter transaction parameters for undertaking transactions on the blockchain network.

Figure 6A:
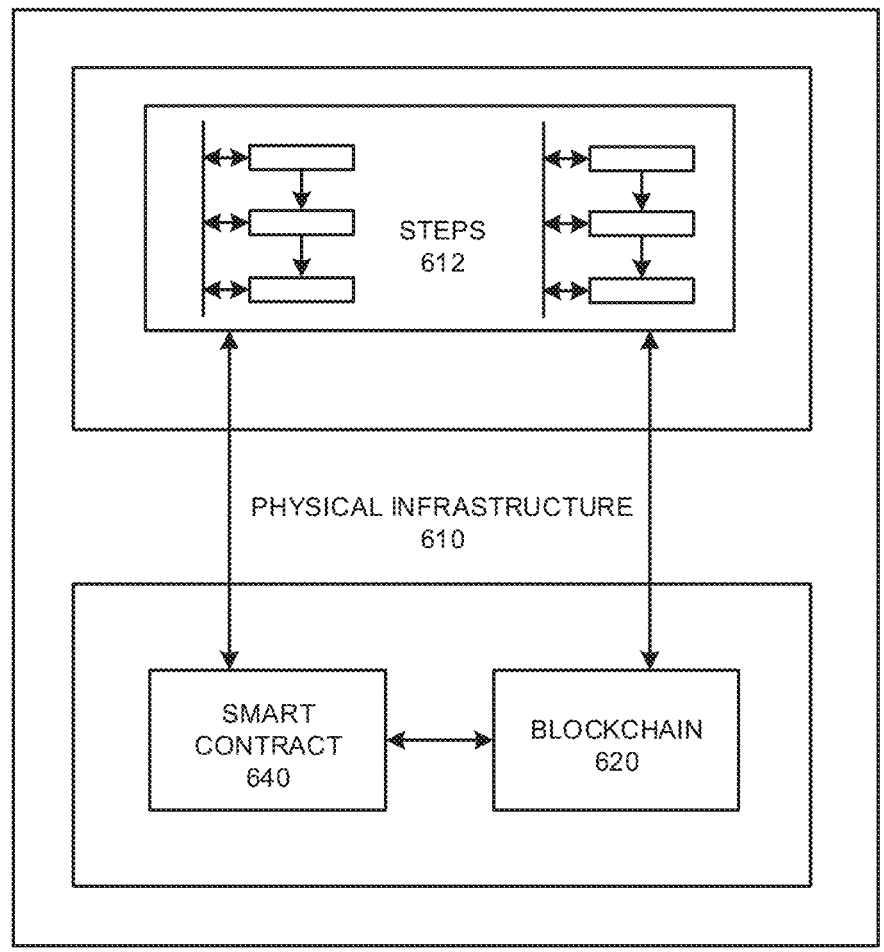
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
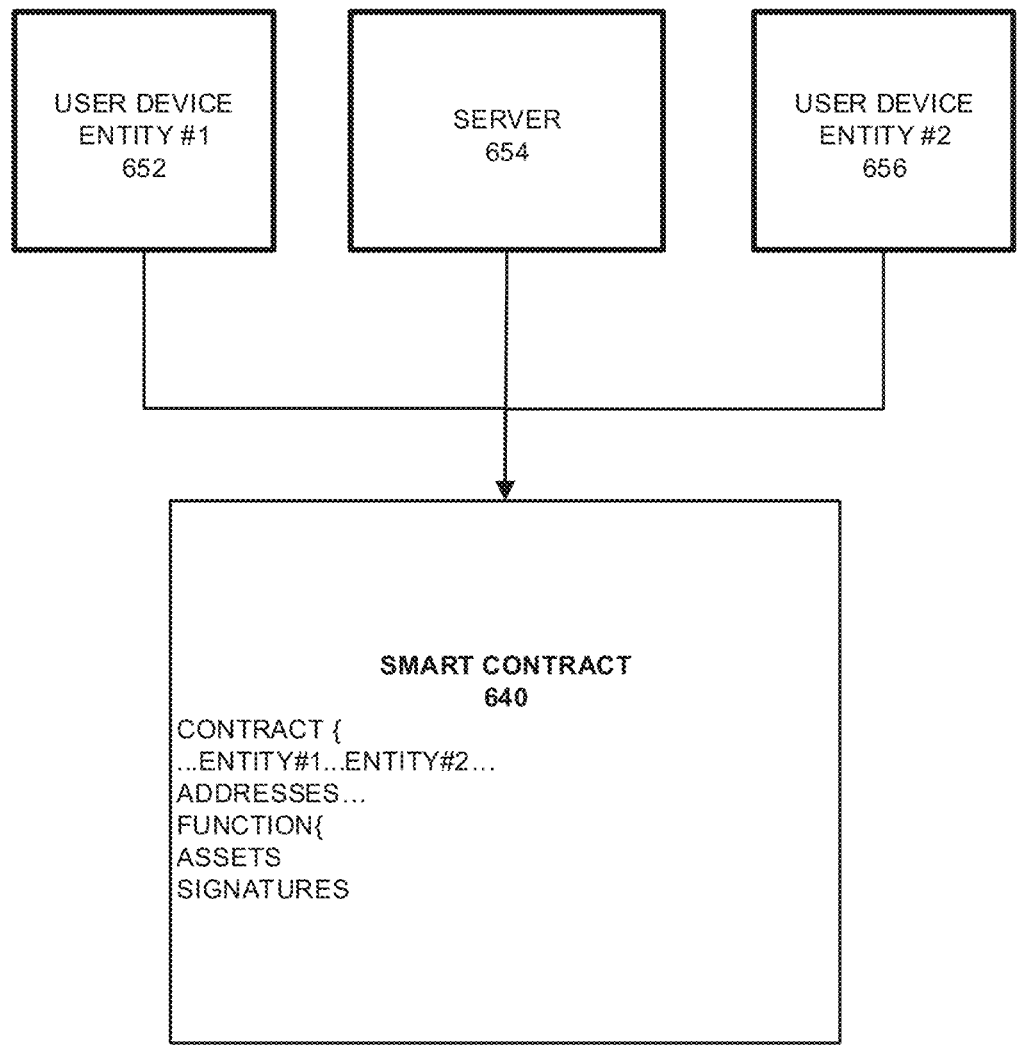
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
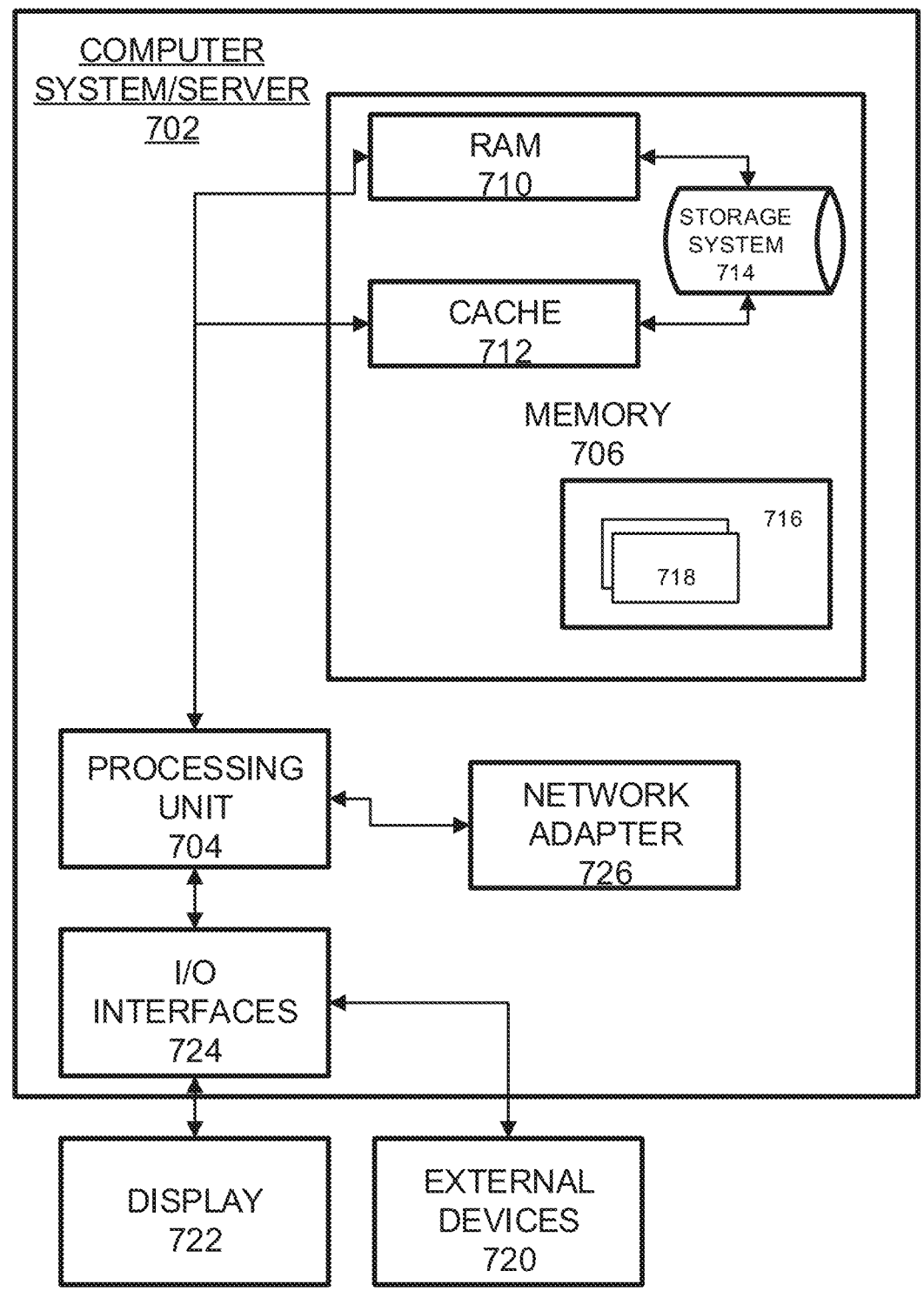
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
 receiving, by a wallet, transaction parameters comprising a transaction amount to be sent to an intended recipient address;
 retrieving, by the wallet, an anonymous transaction certificate for a blockchain wallet from a certificate authority based on a wallet certificate signed by a manufacturer of the blockchain wallet;
 determining, by the wallet, whether to use the intended recipient address or an address of a mining pool as a recipient address;
 in response to determining whether to use the intended recipient address or an address of a mining pool as a recipient address, generating, by the wallet, a blockchain transaction that comprises the transaction amount, an anonymous transaction key in place of a sender address, and the address of the mining pool in a field of the recipient address;
 attaching, by the wallet, the anonymous transaction certificate to the blockchain transaction; and
 transmitting, by the wallet, the blockchain transaction with the anonymous transaction certificate attached to the mining pool.

2. The method of claim 1, further comprising generating the anonymous transaction key based on a random number generator.

3. The method of claim 1, further comprising verifying that one or more of: the intended recipient address has not previously been used by the blockchain wallet; and the transaction amount comprises one of a set of predetermined allowable transaction a mounts.

4. The method of claim 1, wherein the generating the blockchain transaction comprises generating a single output comprising the transaction amount.

5. A hardware wallet comprising:
one or more processors; and
one or more memories operatively associated with the one or more processors;
wherein the one or more processors are programmed to:
receive transaction parameters for a blockchain transaction, the transaction parameters comprising a transaction amount to be sent to an intended recipient address;
retrieve an anonymous transaction certificate for a blockchain wallet from a certificate authority based on a wallet certificate signed by a manufacturer of the blockchain wallet;
determine whether to use the intended recipient address or an address of a mining pool as a recipient address;
in response to determining whether to use the intended recipient address or an address of a mining pool as a recipient address, generate a blockchain transaction that comprises the transaction amount, an anonymous transaction key in place of a sender address, and the address of the mining pool in a field of the recipient address;
attach the anonymous transaction certificate to the blockchain transaction; and
transmit the blockchain transaction with the anonymous transaction certificate attached thereto the mining pool.

6. The hardware wallet of claim 5, further comprising a random number generator that generates the anonymous transaction key.

7. The hardware wallet of claim 5, wherein the one or more processors are further programmed to verify that one or more of: the intended recipient address has not previously been used by the bloc pain Het; and the transaction amount comprises one of a set of predetermined allowable transaction a mounts.

8. The hardware wallet of claim 5, wherein the one or more processors are further programmed to generate a single output comprising the transaction amount.

9. A non-transitory computer readable medium comprising instructions, that when read by a processor, cause the processor to perform a method comprising:
receiving transaction parameters comprising a transaction amount and an intended recipient address;
retrieving an anonymous transaction certificate for a blockchain wallet from a certificate authority based on a wallet certificate signed by a manufacturer of the blockchain wallet;
determining whether to use the intended recipient address or an address of a mining pool as a recipient address;
in response to determining whether to use the intended recipient address or an address of a mining pool as a recipient address, generating a blockchain transaction that comprises the transaction amount, an anonymous transaction key in place of a sender address, and the address of the mining pool in a field of the recipient address;
attaching the anonymous transaction certificate to the blockchain transaction; and
transmitting the blockchain transaction with the anonymous transaction certificate attached to the mining pool.

10. The method of claim 9, wherein the method further comprises generating the anonymous transaction key based on a random number generator.

11. The nor-transitory computer readable medium of claim 9, wherein the method further comprises verifying that one or more of: the intended recipient address has not previously been used by the blockchain wallet; and the transaction amount comprises one of a set of predetermined allowable transaction amounts.

12. The non-transitory computer readable medium of claim 9, wherein the generating the blockchain transaction comprises generating a single output comprising the transaction amount.

* * * * *